Patented June 28, 1949

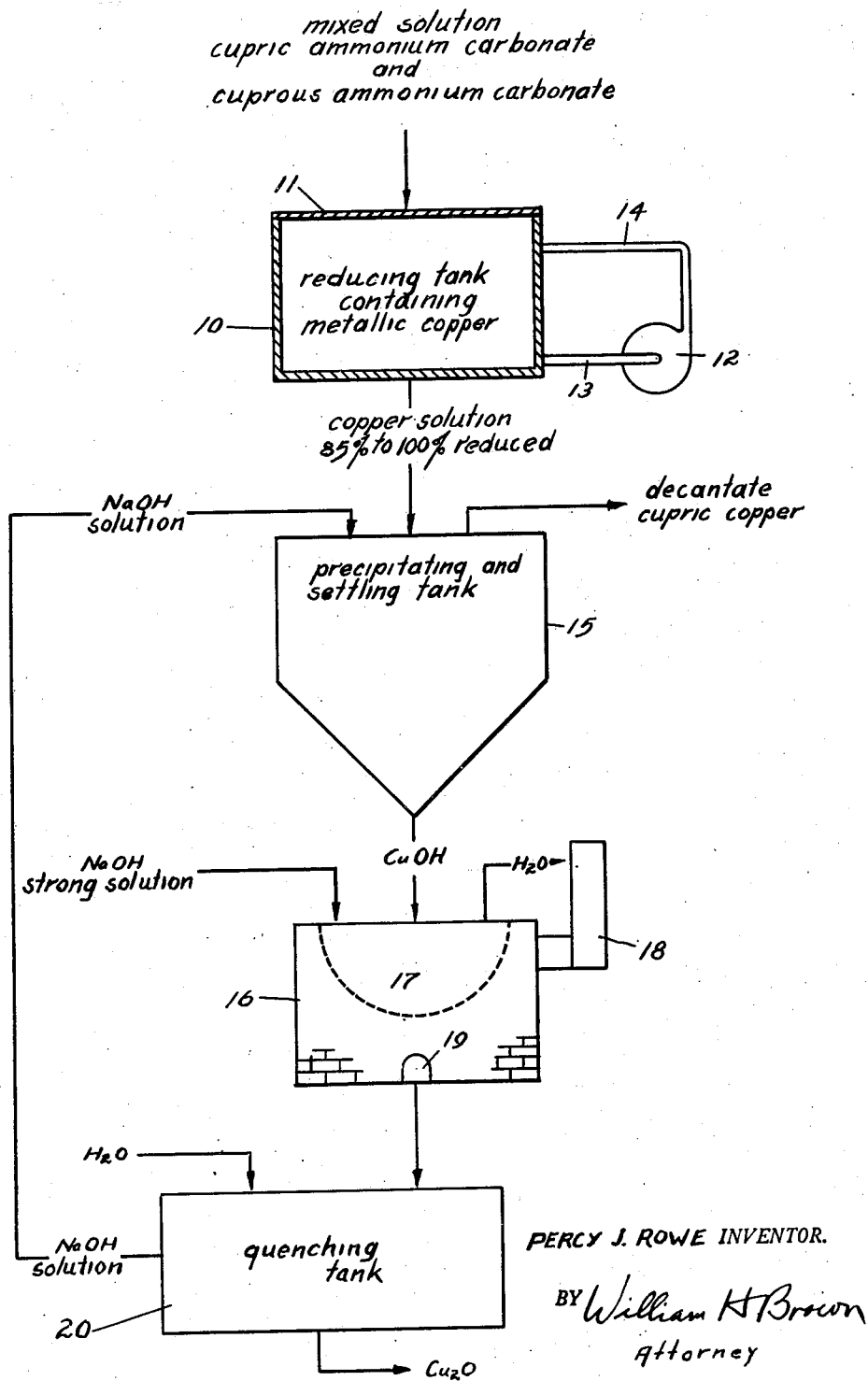

2,474,497

UNITED STATES PATENT OFFICE 2,474,497

PRODUCTION OF CUPROUS HYDROXIDE AND CUPROUS OXIDE

Percy J. Rowe, Hubbell, Mich., assignor to Lake Chemical Company, Calumet, Mich., a corporation of Michigan Application February 16, 1946, Serial No. 648,153

2 Claims. (Cl. 23—147)

This invention relates to the production of cuprous oxide and has for its principal object to provide a process for recovering cuprous oxide from solutions containing copper ammonium carbonate.

Prior to my invention a number of methods have been proposed for the production of cuprous oxide but so far as I am aware none of these has proved completely satisfactory and no one has to my knowledge disclosed a process suitable for recovering cuprous oxide from the commercially available copper solutions which I propose to employ.

I have now discovered a process for producing cuprous oxide (or, optionally, cuprous hydroxide) from solutions containing copper in the form of cuprous ammonium carbonate or both cuprous and cupric ammonium carbonate. I preferably treat the solution (usually mixed because of the difficulty in obtaining a solution in which the copper is entirely cuprous) if it contains more than about 15% of the copper in cupric form, to reduce the amount of cupric copper and increase the amount of cuprous copper in solution. I have found that I am able to precipitate a cuprous compound which I believe to be cuprous hydroxide (CuOH) from solutions containing 50% or more (preferably 75% or more) of the copper in solution in the form of cuprous ammonium carbonate (the remainder being in the form of cupric ammonium carbonate) and without precipitating an excessive quantity of cupric hydroxide, and by a separate step to convert the cuprous hydroxide into cuprous oxide and dissolve out a part of the small proportion of $Cu(OH)_2$ precipitated.

I first contact an aqueous solution containing cuprous and cupric ammonium carbonates in suitable concentrations with metallic copper in the absence of air whereby to obtain a solution wherein at least 50%, and preferably 75% or more, of the copper is present as cuprous copper and then treat such solution with an amount of alkali sufficient to precipitate substantially all the cuprous copper in solution but insufficient to precipitate any substantial proportion of the cupric copper. (The reduction of cupric copper to cuprous copper may be omitted if the desired proportion of cuprous copper is already present in the starting solution). I then convert the precipitate to oxide by treatment with strong caustic.

The amount of alkali required for the preferential precipitation step can be determined by calculation. Thus, the cuprous ammonium carbonate and ammonium carbonate content of the mixed copper solution being known from experience with a closely controlled solution or by analysis, the stoichiometric quantity can be calculated according to the following reactions:

$$Cu_2CO_3 \cdot xNH_3 + 2NaOH \rightarrow 2CuOH + Na_2CO_3 + xNH_3$$
$$(NH_4)_2CO_3 + 2NaOH \rightarrow Na_2CO_3 + 2NH_3 + 2H_2O$$

Less than the amount of caustic thus calculated will give satisfactory results, that is, will precipitate substantially all the cuprous copper, and a greater quantity can be tolerated, that is, will not precipitate any great quantity of cupric copper. The amounts of cupric copper precipitated when greater amounts of caustic are employed depend not only upon the concentration of cuprous ammonium carbonate and ammonium carbonate but also upon the concentration of cupric copper so that for solutions containing above 85% of the copper in cuprous form, it is possible to utilize greater proportions of caustic soda without precipitating a great deal of cupric copper. In any case, the practical limits are more or less a matter of choice since the considerations which actually determine the limits are on the one hand the amounts of cuprous copper which it is decided can be allowed to remain unprecipitated and on the other hand the amounts of cupric copper which can be allowed to be precipitated. I prefer to use from 0.8 to 1.5 times the calculated proportion of caustic required by the above formula. Stated in terms of the final product, I prefer to use from 1 to 2 pounds of caustic soda (or the molecular equivalent of KOH) for each pound of $Cu_2O$ produced.

In the accompanying drawings the figure is a flow sheet illustrating the preferred embodiment of the invention.

The initial copper ammonium carbonate solution preferably normally is one containing approximately 40 grams per liter of $CO_2$, 60 grams per liter of $NH_3$, and 35 to 40 grams per liter of copper, a large part of which may be in the oxidized condition; i. e., cupric ammonium carbonate. A solution meeting these general requirements is now produced commercially in a process for dissolving copper from various types of copper-bearing materials. This commercial composition may be expected to vary within limits as follows: $CO_2$ from 30 to 70 grams per liter; $NH_3$ from 35 to 75 grams per liter; and copper from 10 to 50 grams per liter. Any of these solutions, and others of similar composition, however produced, are suitable as starting solutions for my process, the only restriction being that they must be sufficiently low in copper to permit the subsequent addition of copper in amounts sufficient to reduce a large part of the cupric copper initially in solution to cuprous copper before this reduction is inhibited by the limited solubility of copper in solution.

As shown in the accompanying flow sheet, the copper ammonium carbonate starting solution is run into a closed tank or vessel 10 (provided with a cover 11 whereby to exclude air) containing metallic copper in the form of scrap sheet, wire, clippings, or other form presenting a relatively large surface area. Circulation of the copper solution is induced in this tank by a pump or other mechanical means 12 communicating with the tank 10 through pipes 13 and 14. The net result of such treatment is the production of a copper ammonium carbonate solution containing 50 per cent or more of the dissolved copper in the reduced (cuprous) state. Although I prefer to work in the higher ranges of cuprous content (e. g. 85% to 99% or if found practicable, which is hardly likely, even 100% of the copper in cuprous form) the reaction progresses satisfactorily in the lower concentrations down to a minimum of 50 per cent. A solution of this type (low cupric content) might contain 40 grams per liter of $CO_2$, 60 grams per liter of $NH_3$, and 60 grams per liter of copper, the increase in copper over that in the starting solution being due to the dissolving of metallic copper by action of cupric copper during its reduction in the starting solution. Such a solution should contain from 30 to 70 grams per liter of $CO_2$, 35 to 75 grams per liter of $NH_3$, and 20 to 100 grams per liter of copper or even higher up to the limit of solubility of copper in said solution. This wholly or partially reduced copper solution from the first step in the process is then conveyed to a suitable closed vessel 15, preferably having a cone-shaped bottom. Prior to the introduction of the cuprous copper enriched solution, I introduce a solution of caustic soda (wherever caustic soda is mentioned herein, KOH might be used but caustic soda is preferred) into the tank in calculated amounts as previously described approximately those which are just sufficient to combine with the $CO_2$ content and precipitate all or nearly all of the cuprous content of the solution as a yellow precipitate of cuprous hydroxide (or hydrated cuprous oxide) but insufficient to precipitate any large quantity of cupric copper. Although I prefer to introduce the reduced copper ammonium carbonate solution into the caustic, the reaction proceeds satisfactorily when the solution of caustic soda is added to the solution of copper ammonium carbonates. The reaction between the caustic soda and the copper ammonium carbonate solution may be suitably carried out at room temperature, but some degree of heating, such as that resulting from the contact between the caustic alkali and the ammoniacal solution, or external heating, facilitates the rapid coagulation and separation of the precipitate. In either case, the precipitate is permitted to settle and the supernatant liquid is removed by decantation or other suitable means. The values in this liquor may be recovered as hereinafter stated. The yellow precipitate of cuprous hydroxide may be washed, in the absence of air insofar as practical, by any convenient method to remove from it essentially all sodium salts, ammonia, and cupric copper.

The resulting yellow cuprous hydroxide in the form of mud or thick slurry may be treated in this same vessel or transferred into other suitable equipment, such as a furnace 16 having a receptacle 17, a stack 18 and fire box opening 19, where additional caustic soda is added. The concentration of caustic is not critical, but concentrations of 50 per cent or more are preferred in order to reduce the period required to eliminate essentially all of the water. Heat is applied to effect evaporation of the water, and with increasing temperature the concentration of caustic is built up. When a temperature of approximately 200° F. is reached, the conversion from cuprous hydroxide to cuprous oxide begins, as evidenced by a change in the color of the slurry from yellow to red, and as further water is evaporated and the caustic concentration is increased, the reaction proceeds until at about 300° F. the conversion appears to have been completed. A temperature of 300° F. however, is not a critical upper limit, and heating may be continued further (with consequent increase in temperature) up to say 600° F. or even higher. Alternatively the conversion may be effected by prolonged heating at temperatures between 200° F. and 250° F. The cuprous oxides produced at different temperatures of conversion have somewhat different physical characteristics with respect to particle size, color, etc., but temperature does not appear to affect the cuprous oxide content nor the total reducing power.

After the cuprous hydroxide has been converted to the cuprous oxide, water may be added to prevent crystallization of the caustic alkali, and the material transferred to any suitable vessel 20 where the cuprous oxide is washed free from caustic. It is then filtered, and dried by any suitable method.

My preference is always to work with solutions in which the greater part of the copper is in the cuprous form, and when solutions containing more than 85% of the copper in the cuprous form are employed the product is always of excellent quality. In cases where the solution contains only 50% or 60% of the copper in the form of cuprous ammonium carbonate, it is sometimes desirable to boil the final product in an excess of caustic soda to dissolve out the cupric oxide and thereby improve the product. It is, of course, preferable to avoid this step by treating the initial solution to convert the cupric ammonium carbonate to the corresponding cuprous compound. For example, note the following experimental results.

*Table I*

| No. | Total Cu, Gm./L. | Per Cent Cuprous | Reducing Power of Product | Reducing Power of Product After Reboiling with NaOH |
|---|---|---|---|---|
| 1 | 59 | 92 | Per Cent 98.76 | Per Cent |
| 2 | 60.75 | 55 | 90 | 98 |

In another series of experiments, sufficient caustic was added during the initial precipitation to precipitate all the copper, both cuprous and cupric.

*Table II*

| No. | Total Cu, Gm./L. | Per Cent Cuprous | Reducing Power of Product | Reducing Power of Product After Reboiling with NaOH |
|---|---|---|---|---|
| 1 | 60.7 | 55 | Per Cent 56.5 | Per Cent 98.4 |
| 2 | 44.8 | 35.5 | 35.6 | |

In each of the above tables, reducing power is expressed in percentage and is compared with pure cuprous oxide as 100%. The first two columns refer to concentrations in the solution from which the hydroxide is precipitated. The last columns indicate the result when the oxide was reboiled with an excess of caustic soda. The amount actually used was about equi-molecular with the $Cu_2O$ in the product.

From these tables it may be concluded that the caustic not only converts the initial precipitate (CuOH plus Cu(OH)$_2$) to oxides but also acts as a solvent for the cupric copper contained in the precipitate. This effect of dissolving cupric copper compounds takes place to some extent when the process is carried out under normal, favorable conditions; that is, during the conversion of the hydroxide to the oxide, and this, as well as the effect of selective precipitation of cuprous hydroxide, contributes to the excellence of the product.

The recovery of the values from the decanted liquors containing cupric copper, ammonia, caustic, and carbon dioxide, is not essential to the operation of my process, but is economically desirable. This recovery might be accomplished by various known methods; such as, distilling the ammonia, precipitating the copper as cupric oxide or carbonate, and evaporating the mother liquor to obtain soda ash. These products are not all immediately returnable to my process, but may be utilized in related industry and it is possible to utilize the caustic liquor from the conversion of the hydroxide to Cu$_2$O in precipitation of further quantities of hydroxide.

The following specific example will serve to illustrate the invention:

*Example*

One cubic meter of copper ammonium carbonate solution was prepared containing 35 grams per liter total copper, of which 30 grams per liter was in the cupric state and 5 grams per liter in the cuprous state. The solution contained 40 grams per liter of CO$_2$ and 60 grams per liter of NH$_3$. This volume of copper ammonium carbonate solution was then introduced into a cylindrical tank 10, having a capacity of 1½ cubic meters, which had been previously filled with copper wire scrap. After closing the tank to exclude essentially all air, the solution was circulated through the bed of copper by pumping in closed circuit 12, 13, 14, for 20 hours at room temperature. At the end of the 20 hour period, the solution assayed 55 grams per liter cuprous copper, 5 grams per liter cupric copper, 40 grams per liter CO$_2$, and 60 grams per liter NH$_3$. The solution was then pumped into an adjacent tank 15 having a capacity of 1¼ cubic meters and constructed with a cone-shaped bottom, into which a solution of 50 per cent caustic soda, containing 185 pounds of NaOH (76% Na$_2$O), had been previously introduced. In order to intimately mix the copper-bearing solution with the caustic solution, and to avoid any oxidation, the prepared copper ammonium carbonate solution was introduced near the bottom of the cone under pump pressure. Precipitation of the yellow cuprous hydroxide occurred almost instantaneously, and after all of the copper ammonium carbonate solution had been introduced, was allowed to settle for 8 hours.

The supernatant liquid above the precipitate was drawn off, and assayed 4½ grams per liter of copper, 54 grams per liter NH$_3$, and an undetermined quantity of sodium carbonate. This solution was treated in an evaporator, where the NH$_3$ was expelled and the gas condensed as aqua ammonia; the copper was recovered as oxide and the remaining solution evaporated for the recovery of sodium carbonate.

The cuprous hydroxide slurry in the cone of the reaction tank was washed with 200 gallons of water by introducing the water under pressure through the bottom of the cone. The precipitate was again allowed to settle for 8 hours, after which the supernatant liquid above the precipitate was drained off and discarded. The resulting cuprous hydroxide weighed 150 pounds. The washed cuprous hydroxide slurry was introduced into a cast iron caustic pot 17, into which had been added 150 pounds of flake caustic soda (76% Na$_2$O). The pot was supported in an oil-fired, well-type furnace 16 and gradually heated for about one-half hour to avoid excess frothing and boiling. During the initial heating the greater part of the ammonia was expelled. When the solution reached a temperature of 250° F. conversion of the cuprous hydroxide to the cuprous oxide became evident as the color changed gradually from yellow to red. The temperature was gradually increased over a period of 2 hours to a maximum of 350° F., although the reaction appeared to be complete at 300° F. The slurry was then diluted with water to approximately 50 per cent caustic and removed to a cone settling tank. The cuprous oxide was allowed to settle for 2 hours, after which the clear caustic solution was decanted from the precipitate and placed in storage for further use. The cuprous oxide precipitate was then washed free of solubles, filtered, and dried. The red cuprous oxide recovered weighed 136 pounds and was of a bright red color with an extremely fine particle size.

Having thus described my invention, what I claim is:

1. A process comprising the steps of mixing with a caustic alkali of the class consisting of sodium and potassium hydroxides an aqueous, ammoniacal copper carbonate solution, said solution containing per liter on an analytical basis from 30 to 70 grams CO$_2$, from 35 to 75 grams of NH$_3$ and from 20 grams per liter to saturation of copper, said copper being present in cuprous form in a major amount but also comprising a substantial amount thereof in cupric form, the caustic alkali being present in such concentration and such amounts that cuprous copper is precipitated as cuprous hydroxide and substantially all of the cupric copper remains in solution, and separating the precipitate of cuprous hydroxide from the reaction mixture.

2. A process as defined in claim 1 further characterized in that the amount of caustic alkali is from 0.8 to 1.5 times the molecular equivalent of the CO$_2$ content of the solution.

PERCY J. ROWE.

REFERENCES CITED

The following references are of record in the file of this patent:

UNITED STATES PATENTS

| Number | Name | Date |
|---|---|---|
| 1,131,986 | Benedict | Mar. 16, 1915 |

OTHER REFERENCES

Comey and Hahn—Dictionary of Chemical Solubilities, Inorganic—MacMillan Co., New York (1921), p. 303.

Inorganic and Theoretical Chemistry by Mellor, vol. 3 (1923), Longmans, Green and Co., New York; page 128.

Solubilities of Inorganic and Organic Compounds by Seidell, vol. 2 (1928), D. Van Nostrand Co., Inc. New York, p. 1183.

Dictionary of Chemical Solubilities by Comey (1896), MacMillan and Co., New York. (pp. 136 and 137.)